Patented Mar. 27, 1928.

1,663,852

UNITED STATES PATENT OFFICE.

GEORGE J. MILLER, OF DOUGLAS, ARIZONA.

PROCESS OF MANUFACTURING STUFFING.

No Drawing. Application filed June 14, 1927. Serial No. 198,865.

The invention has for its principal object the production from old tires, and other rubber scrap material, of a good and cheap filling or stuffing material for cushions, furniture, mattresses, pillows, etc.

In general this result is attained as follows:—The rubber material is soaked in kerosene oil, either cold or hot, as preferred, until it is swollen and softened, with a view to easier grinding.

After the rubber material is sufficiently softened, it is ground to a suitable size, say from that of a coarse powder to that of inch pieces, more or less.

The ground rubber mass is then treated to a bath of hot kerosene oil, which removes some of the materials that cause hardness in the original rubber, and at the same time permanently softens the rubber by the moderately elevated temperature.

The degree of softness desired for different requirements is attained by regulating the temperature and the time of oil treatment; for instance, a short time treatment at a comparatively low temperature produces a harder filling, suitable, say for automobile cushions, while a longer treatment at a comparatively higher temperature produces a very soft product, suitable for the softest sofa pillows.

After treating the rubber mass in the oil bath, it is freed of kerosene oil, either by slow drying at a low temperature, say about 100° C. or by the treatment with some volatile solvent of kerosene oil, which will not hurt the rubber or fabric, such as carbon tetrachloride, or carbon bisulphide.

More in detail the process which constitutes my present invention is carried out in the following manner:—The rubber material to be treated is allowed to soak in kerosene oil, if cold, for three or four days, or if hot, for a matter of about an hour, until the rubber is thoroughly swollen and softened. If hot oil is used, the temperature is kept at about 100° C. to avoid overheating the rubber before the main heat treatment, which is carefully regulated as to temperature.

Much time is saved by thus softening the rubber, grinding it and then finally heating it in the oil, rather than by heating and softening it in one operation and then grinding it. Also the condition of the rubber undergoing the heat treatment is more readily controlled when the rubber is in the ground condition rather than in the whole state.

The grinding is performed in any suitable grinding apparatus, such as is in general use, and the degree of fineness or coarseness of the ground product is regulated according to the particular use to which the filling is to be put, varying, as stated, from a coarse powder to inch pieces, more or less.

The ground mass is placed in a suitable open vessel with an excess of kerosene oil and heated to a temperature not to exceed 200° C. for a period varying from a few minutes to two or three hours; due to the great difference in hardness, composition, etc. in the various scrap rubbers submitted to treatment, each case requires individual attention as regards time and temperature, to produce the desired softness. In some cases a temperature as low as 110° C. may be employed, while in others a temperature nearing 200° C. may be necessary.

When tests, inspection, or experience indicate that the rubber has attained its desired softness, the mass of rubber, fabric, etc. is removed from the oil bath, drained of its surplus oil, and then either dried at a low temperature, say about 100° C. till the oil is eliminated, or it is treated by soaking it in some volatile substance (harmless to rubber) such as carbon tetrachloride, carbon bisulphide, etc., which soaks out the kerosene oil, and is then itself easily dried out of the mass.

The result is a soft, springy filling, which has the advantage of long life, and does not flatten out with use to the extent that hair and cotton fillings do. It is thoroughly sterilized by the hot oil, and has the added advantage of cheapness.

What I claim is:

1. The process of manufacturing stuffing from old rubber tires and scrap, which involves the following steps:—soaking the rubber material in kerosene oil until it softens sufficiently to grind easily; grinding the softened mass to a desirable size; treating the ground material to a bath of kerosene oil, maintained at a temperature not to exceed 200° C. for a period of time varying from a few minutes to several hours until the rubber becomes permanently softened to the degree required to adapt it for its destined purposes; separating the mass from the oil; and finally drying the mass.

2. The process of manufacturing stuffing from old rubber tires and scrap, which involves the following steps:—soaking the rubber material in kerosene oil until it softens sufficiently to grind easily; grinding the softened mass to a desirable size; treating the ground material to a bath of kerosene oil, maintained at a temperature not to exceed 200° C. for a period of time varying from a few minutes to several hours until the rubber becomes permanently softened to the degree required to adapt it for its destined purposes; separating the mass from the oil; and finally drying the mass at a moderate temperature, approximately 100° C.

3. The process of manufacturing stuffing from old rubber tires and scrap, which involves the following steps:—soaking the rubber material in kerosene oil until it softens sufficiently to grind easily; grinding the softened mass to a desirable size; treating the ground material to a bath of kerosene oil, maintained at a temperature not to exceed 200° C. for a period of time varying from a few minutes to several hours until the rubber becomes permanently softened to the degree required to adapt it for its destined purposes; separating the mass from the oil by soaking it in a suitable vehicle such as carbon tetrachloride or carbon bisulphide; and finally drying the mass.

4. The process of manufacturing stuffing from old rubber tires and scrap which involves the following steps:—soaking the mass in kerosene oil at a temperature not to exceed 100° C. until the rubber is thoroughly swollen and softened; then grinding the mass to a desired size; then placing the mass in an open bath of hot kerosene oil whose temperature is not in excess of 200° C., for a sufficient period of time until the rubber becomes permanently softened to the degree required to adapt it for its destined purpose; removing the mass from the bath and draining it of surplus oil; and finally drying the same.

5. The process of manufacturing stuffing from old rubber tires and scrap which involves the following steps:—soaking the mass in kerosene oil at a temperature not to exceed 100° C. until the rubber is thoroughly swollen and softened; then grinding the mass to a desired size; then placing the mass in an open bath of hot kerosene oil whose temperature is not in excess of 200° C., for a sufficient period of time until the rubber becomes permanently softened to the degree required to adapt it for its destined purpose; removing the mass from the bath and draining it of surplus oil; treating the mass with a suitable vehicle such as carbon tetrachloride or carbon bisulphide to soak out the kerosene oil remaining with the mass; and finally drying the mass.

GEORGE J. MILLER.